(12) United States Patent
Elam

(10) Patent No.: US 7,965,794 B2
(45) Date of Patent: Jun. 21, 2011

(54) METHOD AND APPARATUS FOR BROADCASTING WITH SPATIALLY DIVERSE SIGNALS

(75) Inventor: Carl M. Elam, Perry Hall, MD (US)

(73) Assignee: Greenwich Technologies Associates, Greenwich, CT (US)

( * ) Notice: Subject to any disclaimer, the term of this patent is extended or adjusted under 35 U.S.C. 154(b) by 1389 days.

(21) Appl. No.: 10/354,093

(22) Filed: Jan. 30, 2003

(65) Prior Publication Data

US 2004/0092277 A9 May 13, 2004

Related U.S. Application Data

(63) Continuation-in-part of application No. 09/851,450, filed on May 7, 2001, now Pat. No. 6,608,588, and a continuation-in-part of application No. 09/697,187, filed on Oct. 27, 2000, now Pat. No. 6,823,021.

(60) Provisional application No. 60/202,055, filed on May 5, 2000, provisional application No. 60/352,266, filed on Jan. 30, 2002.

(51) Int. Cl.
*H04L 27/00* (2006.01)

(52) U.S. Cl. .................................................. 375/316

(58) Field of Classification Search .............. 375/134, 375/137, 141, 142, 143, 145, 149, 150, 152, 375/260, 267, 299, 315, 316, 343, 364, 368; 455/132, 500, 553.1, 63.4, 65, 279.1, 272.1
See application file for complete search history.

(56) References Cited

U.S. PATENT DOCUMENTS

| | | | |
|---|---|---|---|
| 3,680,100 A | 7/1972 | Woerrlein | |
| 4,028,699 A | 6/1977 | Stevens | |
| 4,045,796 A | 8/1977 | Kline, Jr. | |
| 4,130,811 A | 12/1978 | Katz et al. | |
| 4,330,876 A | 5/1982 | Johnson | |
| 4,965,732 A | 10/1990 | Roy, III et al. | |
| 5,260,968 A | 11/1993 | Gardner et al. | |
| 5,515,378 A | 5/1996 | Roy, III et al. | |
| 5,566,209 A | 10/1996 | Forssen et al. | |
| 5,619,503 A | 4/1997 | Dent | |
| 5,649,287 A | 7/1997 | Forssen et al. | |
| 5,722,083 A | 2/1998 | Konig | |
| 5,732,075 A | 3/1998 | Tangemann et al. | |

(Continued)

FOREIGN PATENT DOCUMENTS

EP 0893 703 A1 1/1999

(Continued)

OTHER PUBLICATIONS

S. Barbarossa, F. Cerquetti, "Simple Space-Time Coded SS-CDMA Systems Capable of Perfect MUI/ISI Elimination," IEEE Communications Letters, vol. 5, No. 12, Dec. 2001.

(Continued)

*Primary Examiner* — Sam K Ahn
(74) *Attorney, Agent, or Firm* — Snyder, Clark, Lesch & Chung, LLP

(57) ABSTRACT

A transmitter broadcasts a signal having a different code characteristic for each of several directions. A receiver receives the broadcast signal from one of the directions and generates an expected signal for that direction based on the code characteristic for that direction. The receiver detects the broadcast signal from the direction based on the expected signal for that direction.

67 Claims, 7 Drawing Sheets

U.S. PATENT DOCUMENTS

| | | | |
|---|---|---|---|
| 5,793,798 | A | 8/1998 | Rudish et al. |
| 5,808,580 | A | 9/1998 | Andrews, Jr. |
| 5,886,988 | A | 3/1999 | Yun et al. |
| 5,909,649 | A | 6/1999 | Saunders |
| 5,930,290 | A | 7/1999 | Zhou et al. |
| 5,940,742 | A | 8/1999 | Dent |
| 6,023,514 | A | 2/2000 | Strandberg |
| 6,031,485 | A | 2/2000 | Cellai et al. |
| 6,031,865 | A | 2/2000 | Kelton et al. |
| 6,097,714 | A | 8/2000 | Nagatani et al. |
| 6,107,963 | A | 8/2000 | Ohmi et al. |
| 6,137,433 | A | 10/2000 | Zavorotny et al. |
| 6,163,564 | A | 12/2000 | Rudish et al. |
| 6,163,566 | A | 12/2000 | Shiino et al. |
| 6,240,122 | B1 | 5/2001 | Miyashita |
| 6,275,679 | B1 | 8/2001 | Elam et al. |
| 6,331,837 | B1 | 12/2001 | Shattil |
| 6,356,528 | B1 * | 3/2002 | Lundby et al. ............... 370/209 |
| 6,362,780 | B1 | 3/2002 | Butz et al. |
| 6,392,588 | B1 | 5/2002 | Levanon |
| 6,580,701 | B1 | 6/2003 | Ylitalo et al. |
| 6,608,588 | B2 | 8/2003 | Elam |
| 6,643,526 | B1 * | 11/2003 | Katz ........................ 455/562.1 |
| 6,771,698 | B1 * | 8/2004 | Beck ............................. 375/224 |
| 2001/0047503 | A1 | 11/2001 | Zhang |

FOREIGN PATENT DOCUMENTS

| | | |
|---|---|---|
| JP | 2000-339929 | 12/2000 |
| WO | WO 93/12590 | 6/1993 |
| WO | WO 98/37654 | 8/1998 |

OTHER PUBLICATIONS

Chee Tiong Desmond NG, "Smart Antennas for Wireless Applications and Switched Beamforming," Dept. of Information Technology and Electrical Engineering, The University of Queensland, Oct. 2001.

D. Giuli et al; *Radar Target Scattering Matrix Measurement Through Orthogonal Signals*; IEE Proceedings—F, vol. 140, No. 4, pp. 233-242 (Aug. 1993).

Merrill Skolnik, *Radar Handbook*, Second Edition, pp. 2.16-2.23, McGraw Hill, 1990.

Dr. Paul C. Chestnut et al., "Implementation of a Multiple Angle Estimator," Sep. 23, 1983.

Chee Tiong Desmond NG, "Smart Antennas for Wireless Applications and Switched Beamforming," Electrical Engineering Thesis Project, http://innovexpo.itee.uq.edu.au/2001/projects/s804113, 2003.

U.S. Appl. No. 09/851,450, filed May 7, 2001.
U.S. Appl. No. 09/697,187, filed Oct. 27, 2000.

* cited by examiner

METHOD AND APPARATUS FOR BROADCASTING WITH SPATIALLY DIVERSE SIGNALS

RELATED APPLICATIONS

This application is a continuation-in-part of U.S. patent application Ser. No. 09/851,450, filed May 7, 2001, now U.S. Pat. No. 6,608,588, which claims the benefit of U.S. Provisional Application No. 60/202,055, filed May 5, 2000, which are both incorporated herein by reference. This patent application also claims the benefit of U.S. Provisional Application No. 60/352,266, filed Jan. 30, 2002, which is incorporated herein by reference. This application is also a continuation-in-part of U.S. patent application Ser. No. 09/697,187, filed Oct. 27, 2000, now U.S. Pat. No. 6,823,021 which is incorporated herein by reference.

FIELD

Methods and systems consistent with this invention relate to broadcasting signals, and in particular broadcasting spatially diverse signals.

BACKGROUND

Broadcast systems, such as mobile telephone communication systems, often experience problems in "multipath environments." A multipath environment can occur when a broadcasted signal reflects or scatters off various objects such as buildings, water towers, airplanes, or cars. A receiver (such as a cell phone) may receive these reflected signals along with the direct or line-of-sight signal. The reflected signals and direct signal may each arrive at slightly different times at the receiver, causing confusion and errors.

This multipath problem is particularly significant in data communications where the difference in arrival times is long compared to the modulation rate of the signals. The multipath problem is also significant in mobile communications where the cell phone may receive many different or changing reflected signals as it moves

SUMMARY

Methods and systems consistent with this invention broadcast a signal having a different code characteristic for each of a plurality of directions; receive the broadcast signal from one of the plurality of directions and generate an expected signal for the one direction based on the different code characteristic for the one direction; and detect the broadcast signal from the one direction based on the expected signal for the one direction.

Both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and, together with the description, serve to explain the principles of the invention.

DETAILED DESCRIPTION

Reference is now made in detail to exemplary embodiments of the invention illustrated in the accompanying drawings. Wherever possible, the same reference numbers are used throughout the drawings to refer to the same or like parts.

Figure 1:
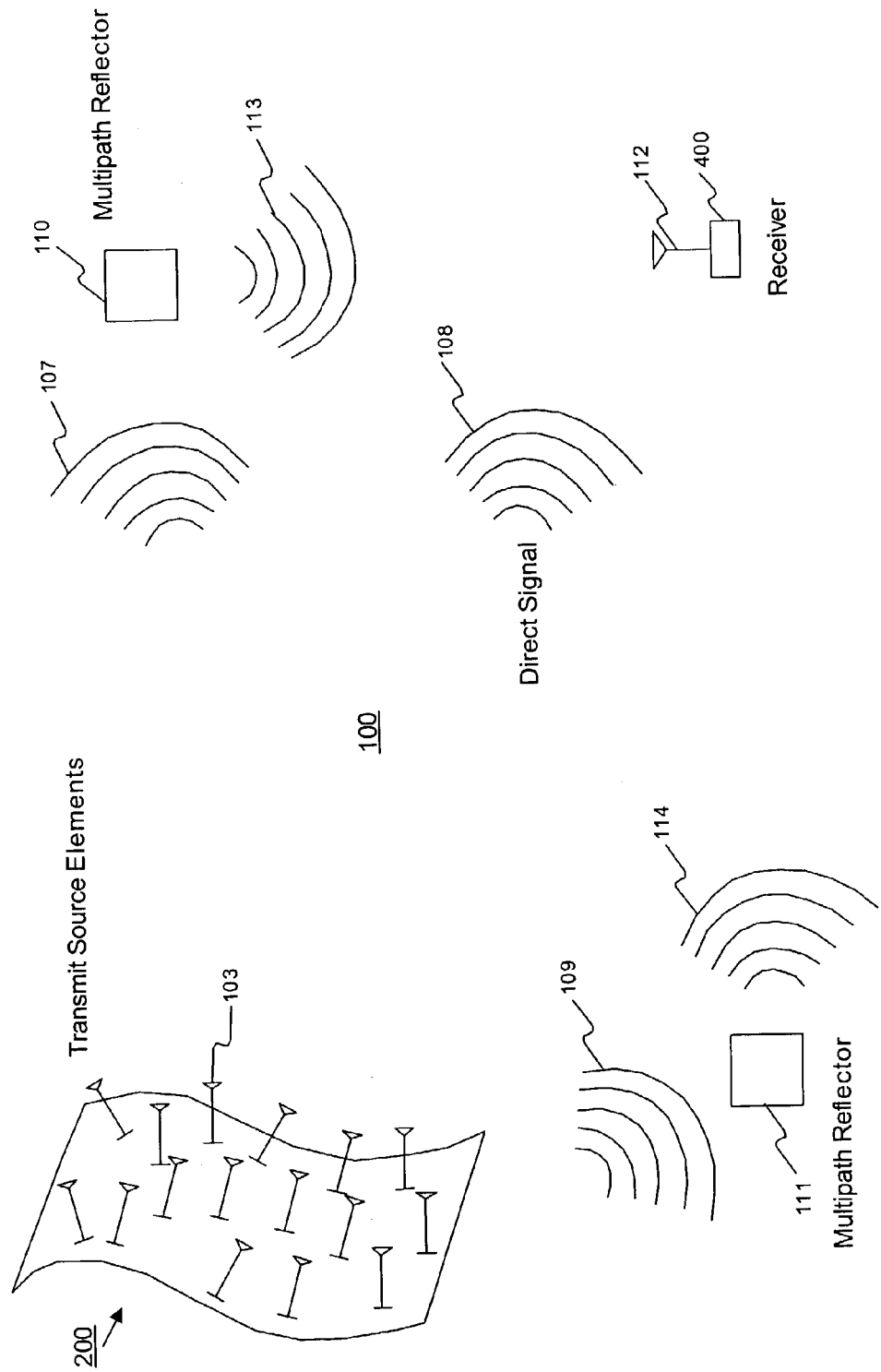
FIG. 1 is diagram of a multipath signal environment.

FIG. 1 is diagram of a multipath signal environment 100 with transmit source elements 103 that are part of a transmitter 200, a first multipath reflector 110, a second multipath reflector 111, and a receive sensor element 112. Transmit source elements 103 transmit a first transmitted signal 107, a second transmitted signal 109, and a direct transmitted signal 108, all of which may be transmitted at the same time. Thus, first transmit signal 107, second transmit signal 109, and direct transmit signal 109 may together be "a broadcast signal." First transmitted signal 107 reflects off first multipath reflector 110, forming a first reflected signal 113. Second transmitted signal 109 reflects off second multipath reflector 111, forming a second reflected signal 114.

Figure 2:
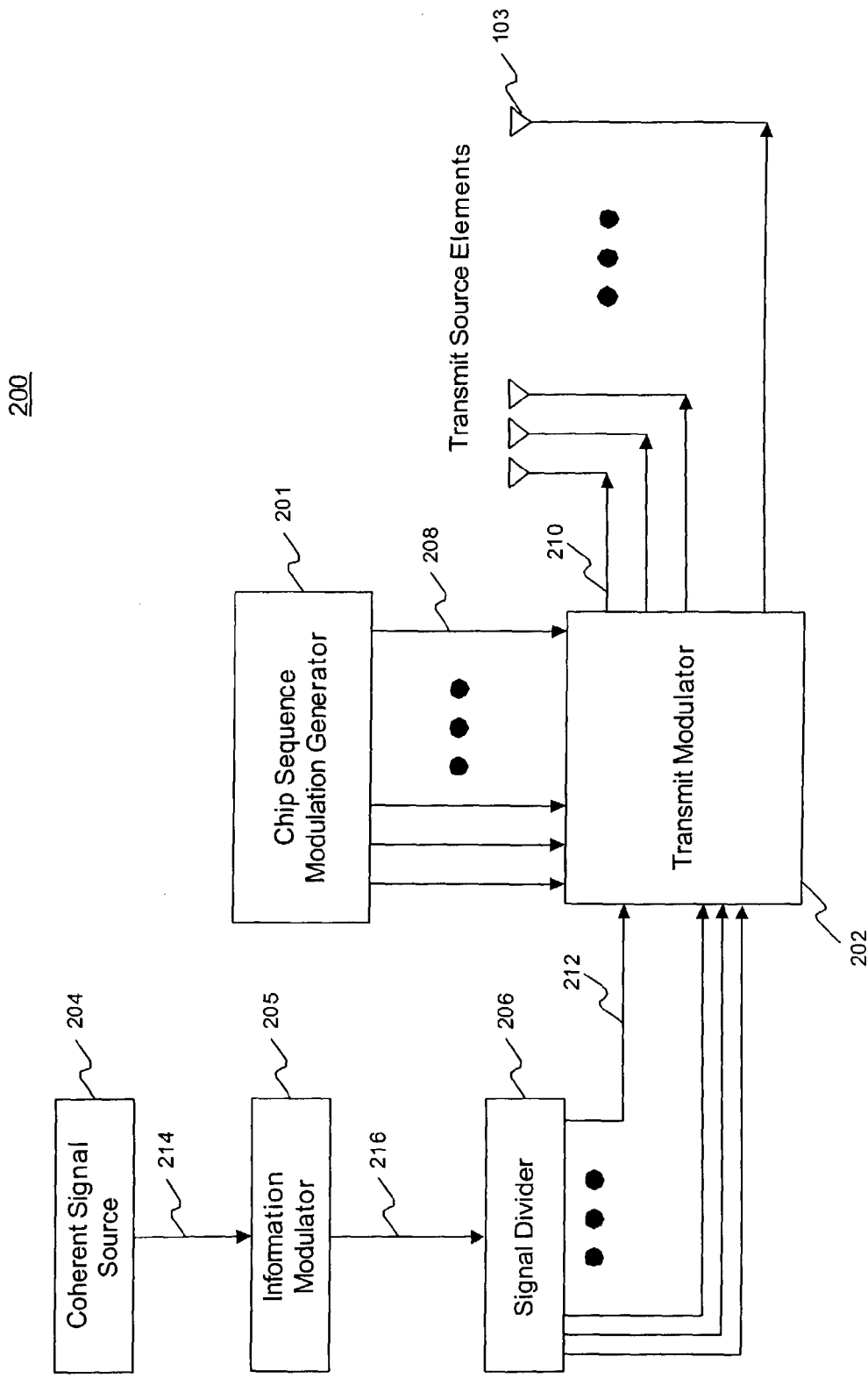
FIG. 2 is block diagram of a transmitter consistent with this invention.

FIG. 2 is block diagram of transmitter 200 consistent with this invention. Transmitter 200 may comprise a chip sequence modulation generator 201, a transmit modulator 202, transmit source elements 103, a coherent signal source 204, an information modulator 205, and a signal divider 206. Signal source 204 may provide a coherent reference carrier signal 214, for example, having a carrier frequency of $10^9$ Hz.

Information modulator 205 receives reference carrier signal 214 and may modulate reference carrier signal according to data or other information. For example, information modulator 205 may modulate by phase, frequency, or amplitude modulation. Information modulator 205 produces a modulated data carrier signal 216.

Signal divider 206 receives modulated data carrier signal 216 and produces a plurality of modulated data carrier signals 212, which may be of equal magnitude. Modulated data carrier signals 212 may also be generated independently and from signal sources that are less than coherent.

Chip sequence modulation generator 201 generates multiple chip sequence signals 208, and may generate one chip sequence for each of modulated data carrier signals 212. Each of chip sequence signals 208 may be statistically independent, random, or pseudo random. For example, chip sequence signals 208 may have a repeating sequence of 5,000 chips. The chips in chip sequence signals 208 may also each have a 20 nanosecond duration, although other chip duration values may be used.

Transmit modulator 202 receives data carrier signals 212 and chip sequence signals 208 and modulates data carrier signals 212 according to chip sequence signals 208. The modulation may be by phase, amplitude, or any other acceptable modulation technique. Each of the data carrier signals 212 may be independently modulated by one of chip sequence signals 208.

Transmit modulator 202 produces chip modulated signals 210 to the transmit source elements 103. Transmit source elements 103 radiate chip modulated signals 210 as a broadcast signal. In FIG. 1, the broadcast signal comprises transmit signals 107, 108, and 109.

Transmit source elements 103 may have many different arrangements, such as a linear, circular, planar, spherical, or conformal array. Transmit source elements 103 may also be various types of radiating elements, for example with an isotropic radiation pattern or a radiation pattern that is sectoral and overlaps to form an aperture. Each of transmit source elements 103 may be separated from each other by approximately ½ wavelength, although much greater separation is also possible.

Figure 3:
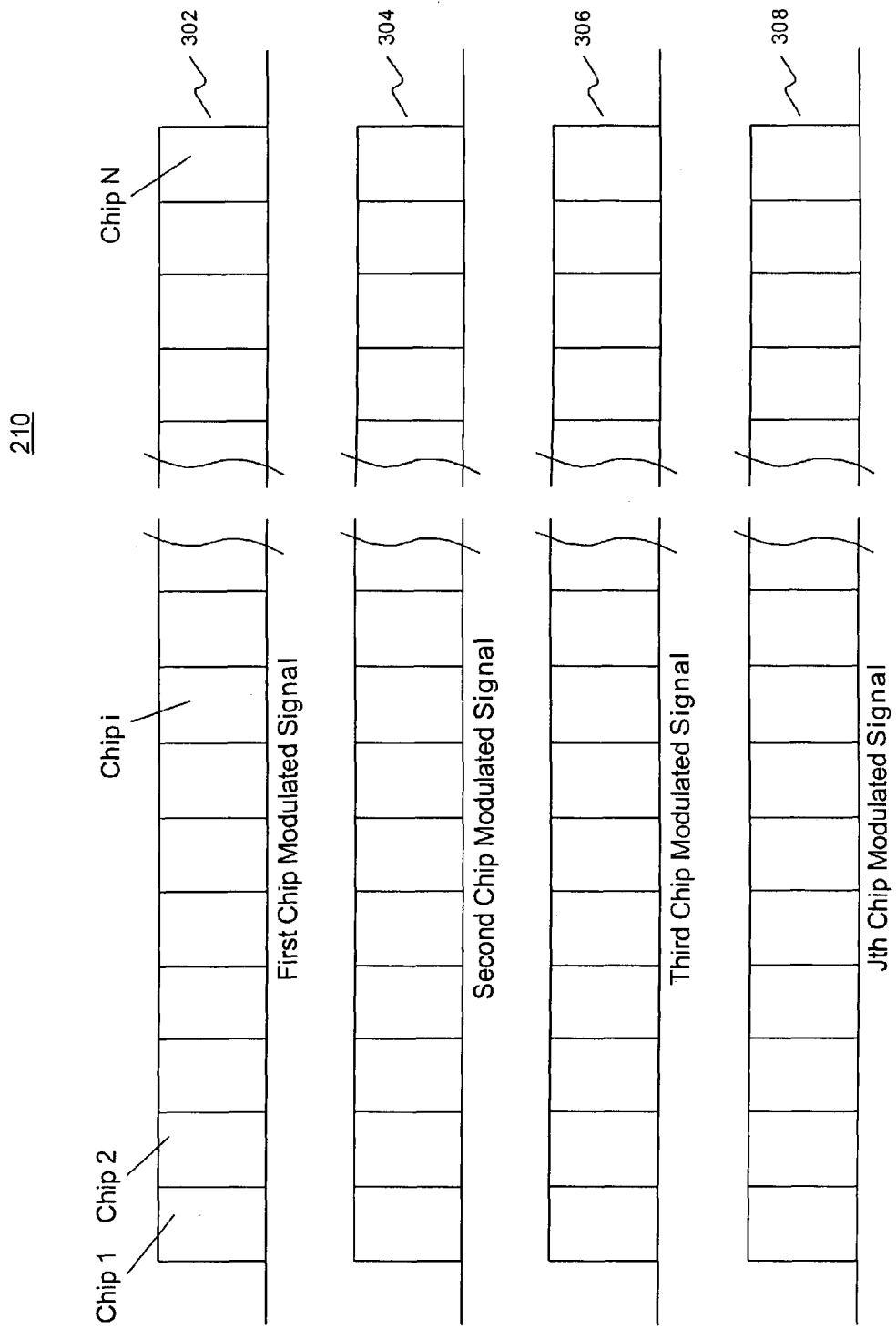
FIG. 3 is signal diagram of chip modulated signals consistent with this invention.

FIG. 3 is signal diagram of chip modulated signals 210 consistent with this invention including a first chip modulated signal 302, a second chip modulated signal 304, a third chip modulated signal 306, and a Jth chip modulated signal 308, each with N chips. J is the number of source elements 103 and N is the number of consecutive chips processed together by a correlator within a receiver, as described below. Each chip may have the same vector magnitude but a random vector angle, or phase. Also, transmitter 200 may broadcast continuous chip modulated signals 210 that may be random or repeated sequences.

Radiated chip modulated signals 210 may combine in space, and the resultant transmitted signals 107, 108, and 109 may differ from each other from chip-to-chip, and may conform to a Rayleigh density function. Therefore, each chip at different points in space surrounding transmit source elements 103 may have different phases and the magnitude may tend to equal the mean value of a Rayleigh density function.

Thus, as a result of modulation performed by transmit modulator 202 in FIG. 2, the chip sequence of first transmitted signal 107, may be different from both the chip sequence of direct transmitted signal 108 and second transmitted signal 109. For example, the chip sequence radiated into each direction of space may be statistically independent and uncorrelated with those radiated in other directions.

When the chip sequence of transmitted signal 107 is different from that of transmitted signal 108, they may be considered in different "code" beams that have different "code characteristics." Thus, each of transmitted signals 107, 108, and 109, radiated in different directions, may be in different code beams each with a different code characteristic. The different code characteristic may be different amplitude or phase characteristics.

Thus, methods and systems consistent with this invention may broadcast a signal with a different code characteristic for each direction. This broadcast signal may be considered "spatially diverse," and may be considered a type of spread spectrum signal.

The aperture of transmit source elements 103 may be used to determine the beamwidth of transmitted signals 107, 108, and 109 illustrated in FIG. 1. Here, beamwidth may refer to code beamwidth.

Figure 4:
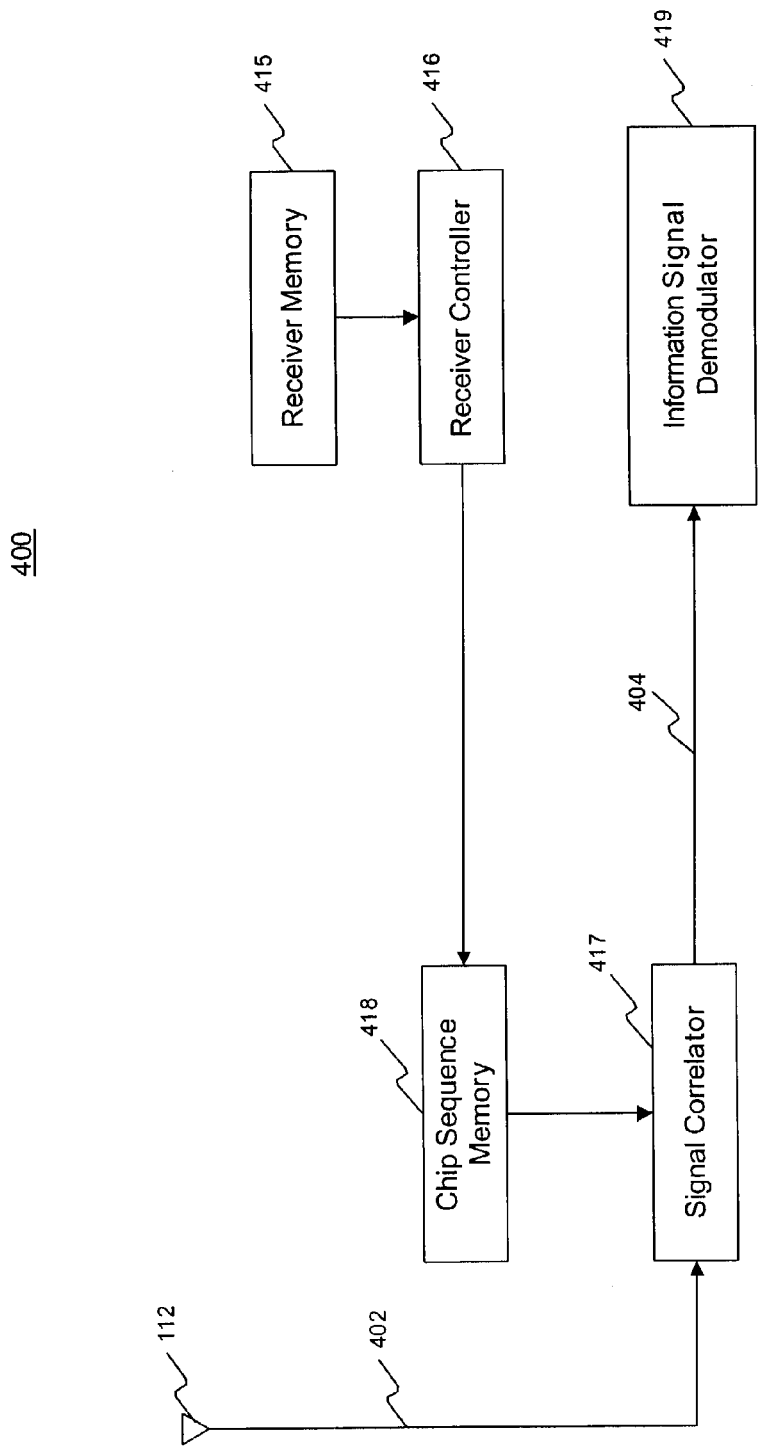
FIG. 4 is block diagram of a receiver consistent with this invention.

FIG. 4 is block diagram of a receiver 400 consistent with this invention. Receiver 400 comprises receive sensor element 112, a receiver memory 415, a receiver controller 416, a signal correlator 417, a chip sequence memory 418, and an information signal demodulator 419. Receive sensor element 112 may receive first reflected signal 113, direct transmitted signal 108, and second reflected signal 114 and send received signal 402 to signal correlator 417.

Receiver controller 416 may compute any or all the expected chip sequences (i.e., code characteristics) of any transmitted signal radiated in any direction (i.e., any code beam) from transmitter 200 as illustrated in FIG. 1. The "expected chip sequences" may be referred to as the "expected signal." For example, receiver controller may compute the expected signals for first transmit signal 107, second transmit signal 109, and direct transmit signal 108. To perform these computations, controller 416 may receive data from receiver memory 415. Receiver memory 415 may store data to compute expected signals, which may include data representing chip sequence signals 208 used in transmitter 200 and the position of transmit source elements 103. Thus, methods and systems consistent with this invention generate an expected signal for a direction based on a code characteristic for the direction. Receiver controller 416 may then output any expected signal to chip sequence memory 418 for storage. The expected signal is sent from chip sequence memory 418 and to signal correlator 417.

Signal correlator 417 may produce a detected signal output 404 that is a measure of the cross-correlation between the received signal and the expected signal. Correlator 417 may use any technique for signal comparison or detection that yields satisfactory detection performance. Signal correlator 417 sends detected signal 404 to information signal demodulator 419.

Receiver 400 may receive direct transmitted signal 108 along with first reflected signal 113 and second reflected signal 114. If receiver 400 chooses to detect direct transmitted signal 108, correlator 417 may receive from chip sequence memory 418 the expected signal from the direction for direct signal 108 and detect direct signal 108. Methods and systems consistent with this invention detect a broadcast signal from a direction based on an expected signal.

Receiver 400 may also choose to detect reflected signals 114 or 113. First reflected signal 113 has the same code characteristic as first transmitted signal 107 and second reflected signal 114 has the same code characteristic as second transmitted signal 109. Receiver 400 may also choose to detect all three signals 108, 113, and 114 using three expected signals. In this case, receiver 400 may add the three detected signals to form a combined signal (after possibly time shifting some of the detected signals), and may use multiple signal correlators for detecting each of signals 108, 113 and 114.

Receiver memory 415 may also contain the expected signals for different directions (different code beams) emitted from transmitter 200. In this case, receiver controller 416 may not have to compute the expected signals, but may pass them to chip sequence memory 418.

Signal correlator 417 may perform a cross correlation between the received signal 402 and the expected signal. The cross correlation may include FINNEGAN groups of N chips. A typical value of N is fifty, but other values may be used. The value of N may depend upon the chip rate and the highest information modulation rate.

Receiver 400 may comprise more than one receive element. Receiver 400 can also use signal processors described in U.S. patent application Ser. No. 09/851,450, filed May 7, 2001, and U.S. patent application Ser. No. 09/697,187, filed Oct. 27, 2000.

Figure 5:
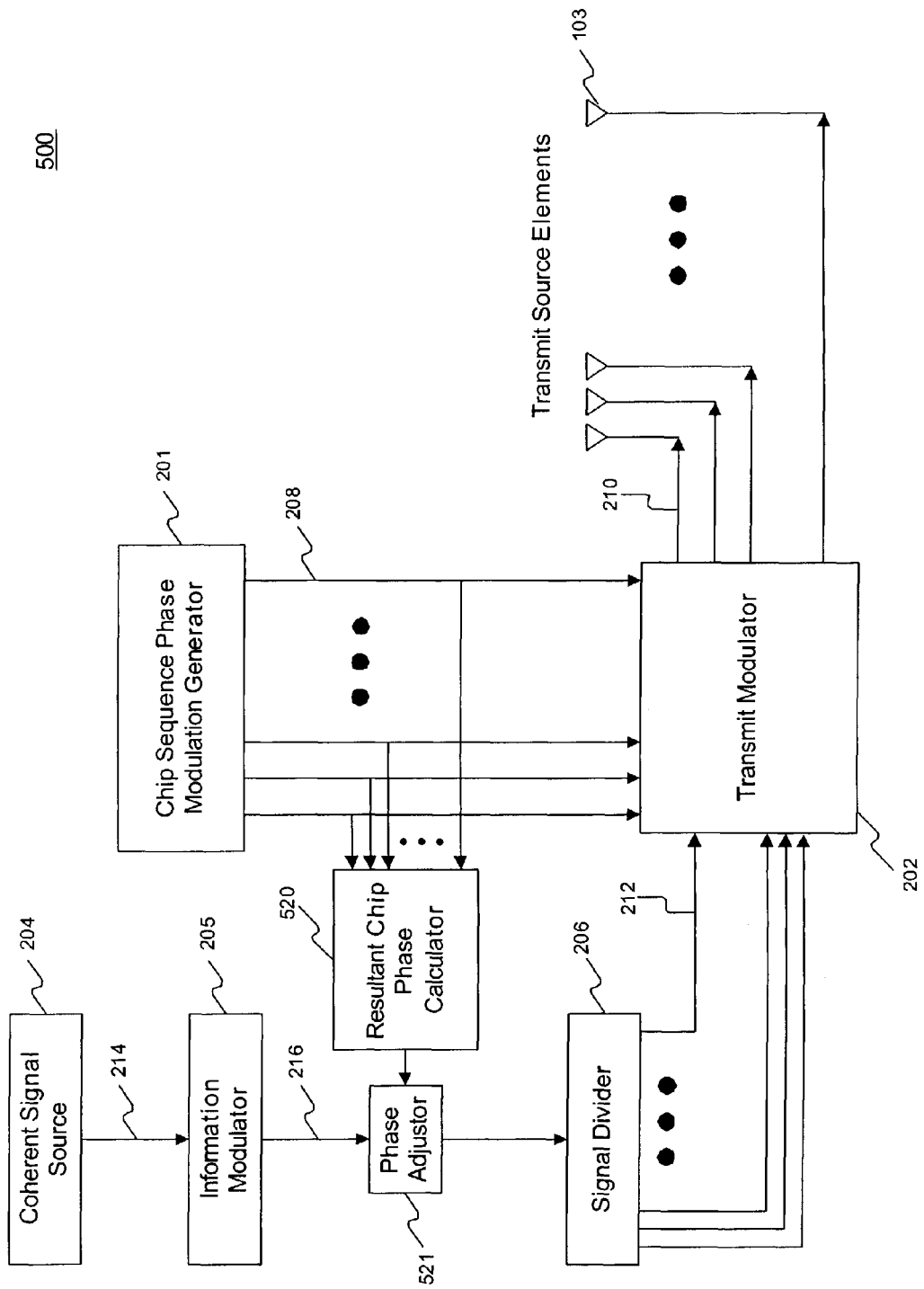
FIG. 5 is a block diagram of another transmitter consistent with this invention.

FIG. 5 is a block diagram of a transmitter 500 consistent with this invention. Transmitter 500 is similar to transmitter 200 in FIG. 2 but also may comprise a resultant chip phase calculator 520 and a phase adjustor 521. Phase adjustor 521 may alter the phase of data carrier signal 216 to remove chip-to-chip phase-shift variations within direct transmitted signal 108 as seen by receive element 112. Phase adjustor 521, however, may avoid altering any phase modulations imposed by the information modulator 205, as seen by receive element 112. To do this, phase shift adjustor 521 may receive information from resultant phase chip calculator 520. Resultant chip phase calculator 520 may store information (such as carrier frequency, transmission line lengths, geometry of transmit source elements 103, and direction of the intended receiver) to calculate the expected signal in the direction of an intended receiver, such as receiver 400. Chip sequence modulation generator 201 may be restricted to producing random phase modulated chips.

Figure 6:
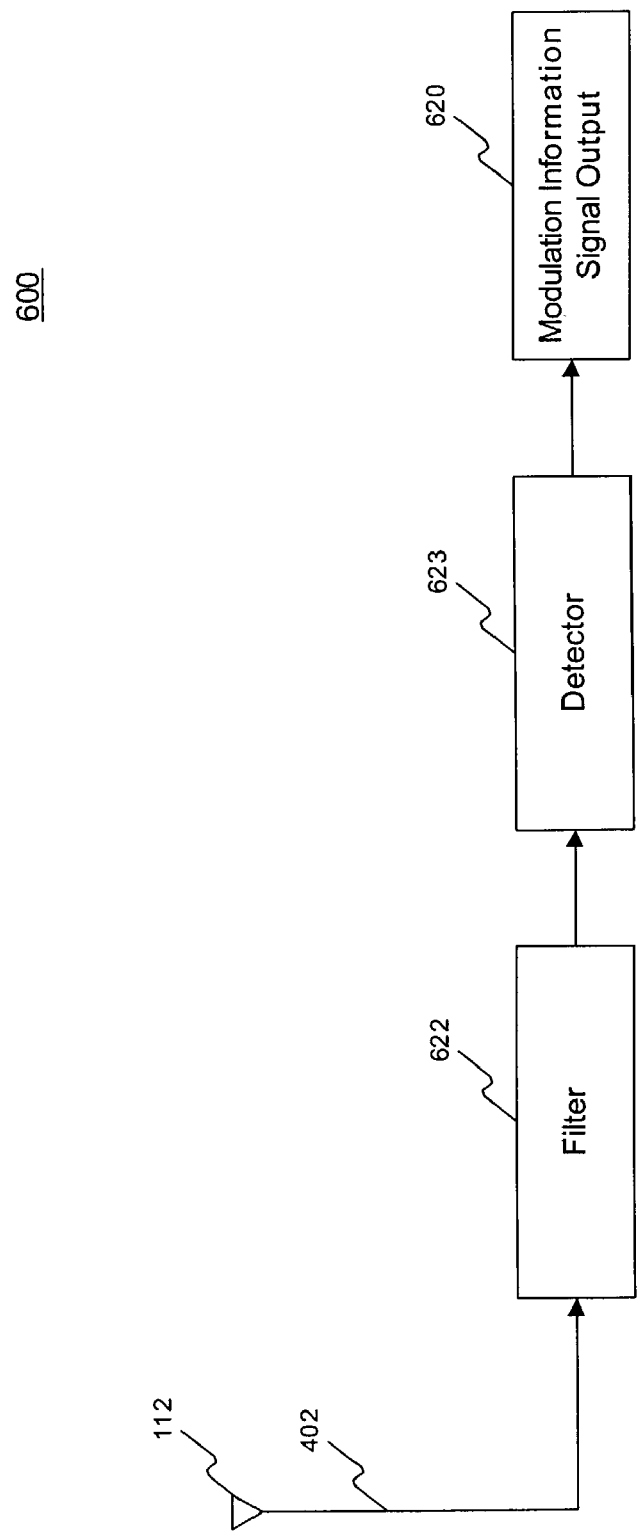
FIG. 6 is a block diagram of another receiver consistent with this invention.

FIG. 6 is a block diagram of a receiver 600 consistent with this invention. Receiver 600 may be similar to receiver 400 of FIG. 4, but may also include a filter 622 and a detector 623 and may be used with transmitter 500. Since the mean amplitude of the chips in direct transmitted signal 108 may tend to the mean of the Rayleigh density function, and since the chip rate may be significantly greater than the information modulation rate, receiver 400 may detect direct transmitted signal 108 with filter 622 and detector 623 and may operate without correlator 417. Receiver 600 may detect direct signal 108 because the chip-to-chip phase-shifts of the chips within direct signal 108 would have been removed by transmitter 500.

In FIG. 6, receive sensor element 112 receives direct transmitted signal 108 and reflected signals 113 and 114. Receive sensor element 112 sends received signal 402 to filter 622. Filter 622 may remove the random amplitude or phase variations of the chips, these variations being at frequencies greater than the information modulation rate. Filter 622 may be a low-pass filter if received signal 402 is a baseband signal. Filter 622 may be a bandpass filter if received signal 402 is conveyed upon a sinusoidal carrier. Filter 622 sends a filtered signal to detector 623, which detects the information modulated by information modulator 205. Finally, detector 623 sends the detected information to modulation information signal output 620.

Figure 7:
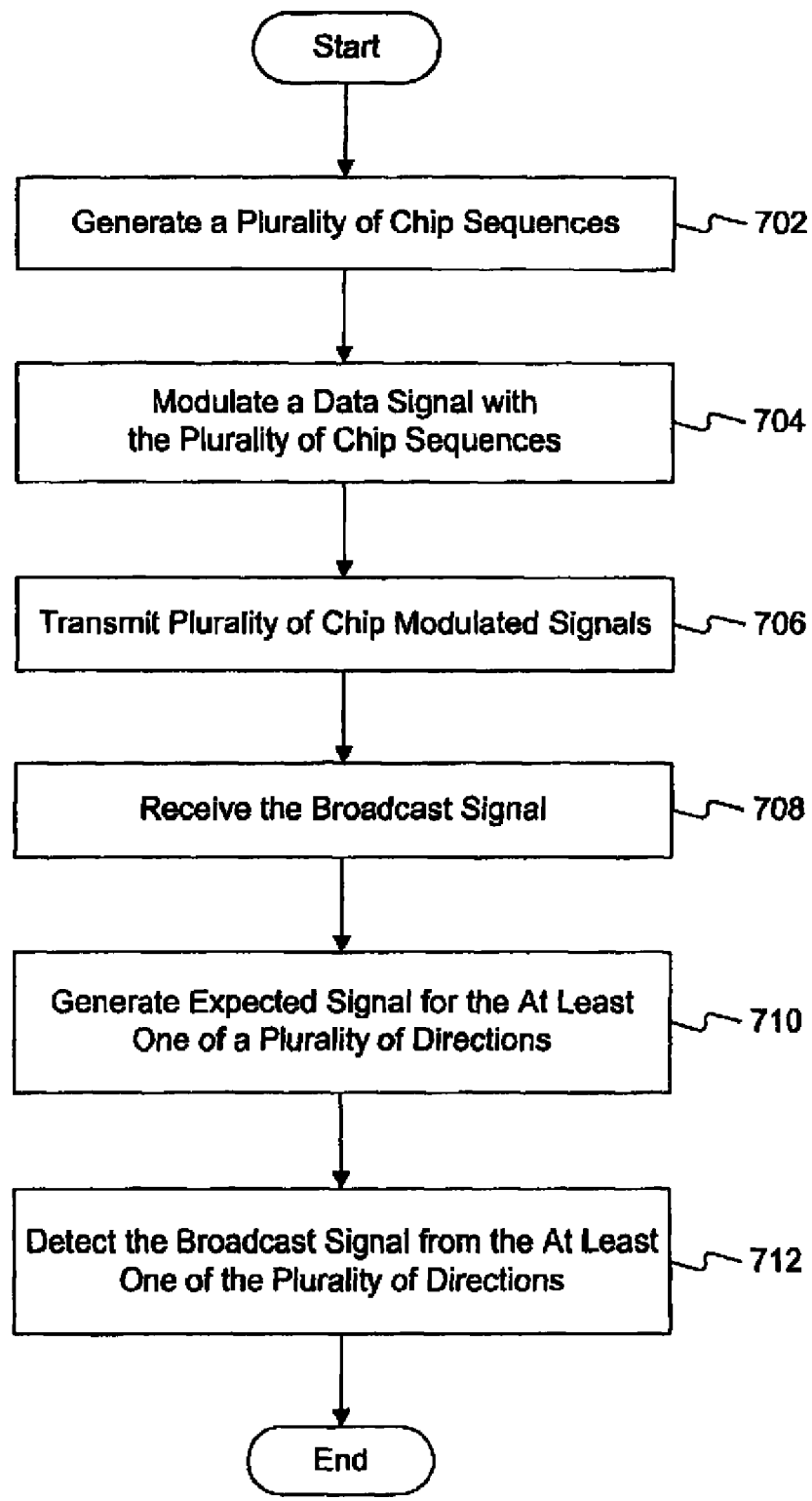
FIG. 7 is a flow chart of a method for broadcasting and receiving signals consistent with this invention.

FIG. 7 is a flow chart of a method for broadcasting and receiving signals consistent with this invention. The method generates a plurality of chip sequences (step 702), and modulates a data carrier signal with the plurality of chip sequences to generate a plurality of chip modulated signals (step 704). The method then transmits the plurality of chip modulated signals, thus broadcasting a signal, wherein the broadcast signal has a different code characteristic for each of a plurality of directions (step 706).

Next, the method receives the broadcast signal from one of the plurality of directions (step 708), and generates an expected signal the direction based on the different code characteristic for the direction (step 710). The method detects the broadcast signal from the direction based on the expected signal for the direction (step 712). Detecting the broadcast signal may include correlating the received broadcast signal with the expected signal.

The method may also receive the broadcast signal from the plurality of directions and generate an expected signal for the plurality of directions based on the code characteristics for the plurality of directions. The method may then detect the broadcast signal from the plurality of directions based on the plurality of expected signals.

In one embodiment, transmit modulator 202 may modulate data carrier signals 212 continuously at a rate that may be one hundred times the highest modulation frequency of the broadcast signal. In the correlation processing, the expected chip sequences from different beam directions may be given the index "K".

Signal correlator 417 may have a processing gain of $\sqrt{N}/1$ where "N" is the number of chips, within a resultant signal block of duration T, processed together, at the same time, by the signal correlator 417. The cross-correlation described may be between the resultant signal and a plurality of K expected signals.

The value for processing gain may be established as follows. A received signal block, which may also be referred to below as the resultant signal, containing N chips may have a correlation energy expression of:

$$R_{EK}(K,\phi) = \int_{tI}^{tI+T} \left\{ \vec{v}_{EK}(t) \right\} \cdot \left\{ \vec{v}_R(t)e^{+j\phi} \right\} dt$$

Where $\vec{v}_R(t)$ is the resultant signal comprised of N chips and $\vec{v}_{EK}(t)$ is the corresponding Kth expected signal also comprised of N chips. Each chip of both $\vec{v}_R(t)$ and $\vec{v}_{EK}(t)$ may have a mean square value expressed as $\alpha_R^2$ and $\alpha_{EK}^2$ respectively, or an r.m.s. value of $\alpha_R$ and $\alpha_{EK}$ respectively, and may be random vectors that conform with Rayleigh density functions with random phase and expected magnitude values of $$\frac{\sqrt{\pi}}{2}\alpha_R \text{ and } \frac{\sqrt{\pi}}{2}\alpha_{EK}$$

respectively. Each chip of $\vec{v}_R(t)$ can be considered as a random vector that is composed of random phase chips from transmit source elements 103.

The phase shift term $e^{+j\phi}$ may be applied equally to all chips of a resultant signal block where the parameter Ø may be chosen to maximize the correlation output for each processed resultant signal block. In applications where the received signal is phase modulated by information modulator 105, as with QPSK, the parameter Ø may be used to derive the carrier phase information.

The magnitude of the correlation energy of N chips, which are well correlated, may be expressed as $$N a_R a_{EK} \left(\frac{T}{N}\right),$$

where T is the resultant signal block duration and where $$\left(\frac{T}{N}\right)$$

is the time interval of a single chip.

If the resultant signal block of chips are random with respect to the corresponding expected signal block of chips, the magnitude of the correlation energy of the N chips may be expressed as $$\sqrt{N}\, a_R a_{EK} \left(\frac{T}{N}\right).$$

In this case, the N resultant signal vectors, represented by N received chips, may have random phases with respect to their corresponding N expected signal vectors represented by corresponding N chips. The sum of N random vectors (with r.m.s. value of $\alpha_R$) may be considered to be two dimensional Gaussian (with r.m.s. value of $\sqrt{N}\alpha_R$).

The value for processing gain may be found by forming the ratio of the correlator output for a well correlated signal $$N\alpha_R\alpha_{EK}\left(\frac{T}{N}\right)$$

and an uncorrelated signal $$\sqrt{N}\,a_R a_{EK}\left(\frac{T}{N}\right).$$

This discussion has described processing the N received chips as a block. Whenever a new block of chips is intercepted by the receiver, receiver controller 416. may form a corresponding new expected block of chips.

Other embodiments of the invention are apparent to those skilled in the art from consideration of the specification and practice of the invention disclosed herein. For example, this invention may apply to acoustic signals as well as electromagnetic signals. The word "signal" used herein may include both electromagnetic and acoustic signals. The word "transmitter" includes acoustic emitters and electromagnetic antennas.

In one embodiment for an underwater acoustic system, chip sequence signals 208 may be a sequence of chips having four millisecond duration. In this embodiment, the carrier frequency may be 5,000 Hz. Other values of frequency and chip duration may be used. Transmit source elements 103 may also be grouped into any irregular arrangement within a region of space or water.

It is generally easier for signal processors to generate pseudo-random numbers rather than purely random numbers, and thus the term "random" used in this application includes "pseudo-random." This pseudo-randomness applies to chip sequence signals 208 that may be either continuously variable or limited to a finite number of values. Finite pseudo-random codes may include Walsh, Barker, or Weltie functions. Finite pseudo-random codes may also include assigning to each chip a phase found by sampling (every 0.1 seconds for each sample) a series of harmonically related angles that are functions of time (e.g., (1t) radians, (2t) radians, (3t) radians, etc.). For example, the series of angles generated by the function (1t) radians, every 0.1 seconds, may modulate one of carrier signals 212; the series of angles generated by the function (2t) radians may modulate another one of carrier signals 212, etc. Also, modulation techniques, such as spread spectrum, may be used in combination with the teachings herein.

The specification and examples should be considered as exemplary only, with a true scope and spirit of the invention being indicated by the following claims.

What is claimed is:

1. A method for broadcasting and receiving data comprising:
    broadcasting a broadcast signal, where the broadcast signal propagates in a plurality of directions and includes a different code characteristic for each of the plurality of directions,
        wherein broadcasting the broadcast signal includes simultaneously transmitting a plurality of modulated signals, wherein each code characteristic for the plurality of directions is a function of at least two of the plurality of modulated signals;
    receiving the broadcast signal from one of the plurality of directions;
    generating an expected signal for the one of the plurality of directions based on the different code characteristic for the one of the plurality of directions; and
    detecting the broadcast signal from the one of the plurality of directions based on the expected signal for the one of the plurality of directions.

2. The method of claim 1, further comprising
    receiving the broadcast signal from the plurality of directions; and
    generating an expected signal for each of the plurality of directions based on the code characteristics corresponding to each of the plurality of directions.

3. The method of claim 2, further comprising detecting the broadcast signal from each of the plurality of directions based on the expected signals corresponding to each of the plurality of directions.

4. The method of claim 1, wherein detecting the broadcast signal comprises correlating the received broadcast signal with the expected signal.

5. The method of claim 1, wherein broadcasting the broadcast signal comprises
    generating a plurality of chip sequence signals;
    modulating a data carrier signal with the plurality of chip sequence signals in order to generate the plurality of modulated signals; and
    wherein the broadcast signal results from the combination in space of the plurality of modulated signals;
    wherein the different code characteristics result from the combination in space of the plurality of modulated signals.

6. The method of claim 5, wherein generating the plurality of chip sequence signals comprises generating chip sequence signals with randomly phased chips.

7. The method of claim 6, wherein the different code characteristic comprises a different phase characteristic.

8. The method of claim 1, wherein simultaneously transmitting the plurality of modulated signals includes simultaneously transmitting at least two of the plurality of modulated signals at a distance apart of approximately one-half a wavelength of the broadcast signal.

9. The method of claim 5, wherein generating a plurality of chip sequence signals includes generating chip sequence signals with random amplitude chips.

10. The method of claim 6, further comprising removing chip-to-chip phase shift variations based on the one of the plurality of directions.

11. The method of claim 6, wherein detecting the broadcast signal comprises detecting the data carrier signal.

12. The method of claim 1, wherein the transmitted plurality of modulated signals combine in space resulting in the plurality of directions of the broadcast signal differing from each other chip-to-chip.

13. A method for receiving data comprising:
    receiving a broadcast signal, wherein the broadcast signal propagates in a plurality of directions and includes a different code characteristic for each of the plurality of directions,
        wherein a simultaneous transmission of a plurality of modulated signals that combine in space form the broadcast signal, and
        wherein the different code characteristics result from the combining in space of the plurality of transmitted modulated signals;
    generating an expected signal for one of the plurality of directions based on the different code characteristic for the one of the plurality of directions; and detecting the broadcast signal from the one of the plurality of directions based on the expected signal for the one of the plurality of directions.

14. The method of claim 13, further comprising
receiving the broadcast signal from the plurality of directions; and
generating an expected signal for the plurality of directions based on the code characteristics corresponding to the plurality of directions.

15. The method of claim 14, further comprising detecting the broadcast signal from each of the plurality of directions based on the plurality of expected signals corresponding to each of the plurality of directions.

16. The method of claim 13, wherein detecting the broadcast signal comprises correlating the received broadcast signal with the expected signals.

17. The method of claim 13,
wherein the plurality of modulated signals are generated by modulating a data carrier signal with a plurality of chip sequence signals in order to generate a plurality of modulated signals, and
wherein simultaneously transmitting the plurality of modulated signals includes simultaneously transmitting at least two of the plurality of modulated signals at approximately one-half a wavelength of the broadcast signal apart.

18. The method of claim 17, wherein the plurality of chip sequence signals comprise chip sequence signals with randomly phased chips.

19. The method of claim 18, wherein the different code characteristic comprises a different phase characteristic.

20. The method of claim 19, wherein the broadcast signal comprises a plurality of code beans.

21. The method of claim 17, wherein the plurality of chip sequence signals comprise chip sequence signals with random amplitude chips.

22. The method of claim 18, further comprising removing chip-to-chip phase shift variations based on the one of the plurality of directions.

23. The method of claim 18, wherein detecting the broadcast signal comprises detecting the data carrier signal.

24. A system for broadcasting and receiving data comprising:
a transmitter to broadcast a broadcast signal that propagates in a plurality of directions and includes a different code characteristic for each of the plurality of directions,
wherein the transmitter includes a plurality of transmit elements to transmit a plurality of modulated signals, and
wherein each code characteristic for the plurality of directions is a function of at least two of the plurality of modulated signals;
a receiver to receive the broadcast signal from one of the plurality of directions;
a receiver controller to generate an expected signal for the one of the plurality of directions based on the different code characteristic for the one of the plurality of directions; and
a detector to detect the broadcast signal from the one of the plurality of directions based on the expected signal for the one of the plurality of directions.

25. The system of claim 24, wherein the receiver receives the broadcast signal from the plurality of directions, and the receiver controller generates an expected signal for each of the plurality of directions based on the code characteristics corresponding to each of the plurality of directions.

26. The system of claim 25, wherein the detector detects the broadcast signal from each of the plurality of directions based on the expected signals corresponding to each of the plurality of directions.

27. The system of claim 24, wherein the detector comprises a correlator to correlate the received broadcast signal with the expected signal.

28. The system of claim 24, further comprising
a chip sequence modulation generator to generate a plurality of chip sequence signals; and
a transmit modulator to modulate a data carrier signal with the plurality of chip sequence signals in order to generate a plurality of modulated signals,
wherein each of the transmit elements simultaneously transmits a different one of the plurality of modulated signals;
wherein, as a result of the combination in space of the plurality of transmitted modulated signals, the broadcast signal is formed;
wherein, as a result of the combination in space of the plurality of transmitted modulated signals, each of the plurality of directions includes a different code characteristic.

29. The system of claim 28, wherein each of the plurality of chip sequence signals comprises randomly phased chips.

30. The system of claim 29, wherein the different code characteristic comprises a different phase characteristic.

31. The system of claim 24, wherein at least two of the plurality of transmit elements are spaced apart by approximately one-half a wavelength of the broadcast signal.

32. The system of claim 28, wherein each of the plurality of chip sequence signals comprises random amplitude chips.

33. The system of claim 29, comprising a phase adjustor to remove chip-to-chip phase shift variations based on the direction.

34. The system of claim 29, wherein the detector detects the data carrier signal.

35. A system for receiving data comprising:
a receiver to receive a broadcast signal, where the broadcast signal propagates in a plurality of directions and includes a different code characteristic for each of the plurality of directions,
wherein the broadcast signal is formed by a simultaneous transmission of a plurality of modulated signals that combined in space, and
wherein the combining in space of the plurality of transmitted modulated signals results in the different code characteristics;
a receiver controller to generate an expected signal for one of the plurality of directions based on the code characteristic for the one of the plurality of directions; and
a detector to detect the broadcast signal from the one of the plurality of directions based on the expected signal for the one of the plurality of directions.

36. The system of claim 35, wherein the receiver receives the broadcast signal from each of the plurality of directions, and the receiver controller generates an expected signal for each of the plurality of directions based on the code characteristics corresponding to the plurality of directions.

37. The system of claim 36, wherein the detector detects the broadcast signal from each of the plurality of directions based on the plurality of expected signals corresponding to each of the plurality of directions.

38. The system of claim 35, wherein the detector comprises a correlator to correlate the received broadcast signal with the expected signal.

39. The system of claim 35,
wherein the plurality of modulated signals are generated by modulating a data carrier signal with a plurality of chip sequence signals in order to generate a plurality of modulated signals, and
wherein simultaneously transmitting the plurality of modulated signals includes simultaneously transmitting at least two of the plurality of modulated signals at approximately one-half a wavelength of the broadcast signal apart.

40. The system of claim 39, wherein each of the plurality of chip sequence signals comprises randomly phased chips.

41. The system of claim 40, wherein the different code characteristic comprises a different phase characteristic.

42. The system of claim 41, wherein the broadcast signal forms a plurality of code beams.

43. The system of claim 39, wherein each of the plurality of chip sequence signals comprises random amplitude chips.

44. The system of claim 40, wherein the detector removes chip-to-chip phase shift variations based on the one of the plurality of directions.

45. The system of claim 40, wherein the detector detects the data carrier signal.

46. An apparatus for broadcasting and receiving data comprising:
means for broadcasting a broadcast signal that propagates in a plurality of directions and includes a different code characteristic for each of the plurality of directions,
wherein the means for broadcasting includes a means for simultaneously transmitting a plurality of modulated signals, and
wherein each code characteristic for the plurality of directions is a function of at least two of the plurality of modulated signals;
means for receiving the broadcast signal from one of the plurality of directions;
means for generating an expected signal for the one of the plurality of directions based on the different code characteristic for the one of the plurality of directions; and
means for detecting the broadcast signal from the one of the plurality of directions based on the expected signal for the one of the plurality of directions.

47. The apparatus of claim 46, further comprising
means for receiving the broadcast signal from the plurality of directions; and
means for generating an expected signal for each of the plurality of directions based on the code characteristics corresponding to each of the plurality of directions.

48. The apparatus of claim 47, further comprising means for detecting the broadcast signal from each of the plurality of directions based on the expected signals corresponding to each of the plurality of directions.

49. The apparatus of claim 46, wherein the means for detecting the broadcast signal comprises means for correlating the received broadcast signal with the expected signal.

50. The apparatus of claim 46, wherein the means for broadcasting the broadcast signal comprises
means for generating a plurality of chip sequence signals;
means for modulating a data carrier signal with the plurality of chip sequence signals in order to generate the plurality of modulated signals; and
means for transmitting simultaneously the plurality of modulated signals that combine in space to form the broadcast signal.

51. The apparatus of claim 50, wherein the means for generating a plurality of chip sequence signals means for comprises generating chip sequence signals with randomly phased chips.

52. The apparatus of claim 51, wherein the different code characteristic comprises a different phase characteristic.

53. The apparatus of claim 46, wherein the means for broadcasting the broadcast signal includes a plurality of transmit elements, wherein at least two of the plurality of transmit elements are spaced apart by approximately one-half a wavelength of the broadcast signal.

54. The apparatus of claim 50, wherein the means for generating a plurality of chip sequence signals includes means for generating chip sequence signals with random amplitude chips.

55. The apparatus of claim 51, further comprising means for removing chip-to-chip phase shift variations based on the direction.

56. The apparatus of claim 51, wherein the means for detecting the broadcast signal comprises means for detecting the data carrier signal.

57. An apparatus for receiving data comprising:
means for receiving a broadcast signal from one of a plurality of directions, wherein the broadcast signal propagates in a plurality of directions and includes a different code characteristic for each of the plurality of directions,
wherein the broadcast signal is formed by a simultaneous transmission of a plurality of modulated signals that combined in space, and
wherein the different code characteristics are formed by the combining in space of the plurality of transmitted modulated signals;
means for generating an expected signal for the one of the plurality of directions based on the different code characteristic for the one of the plurality of directions; and
means for detecting the broadcast signal from the one direction of the plurality of directions based on the expected signal for the one of the plurality of directions.

58. The apparatus of claim 57, further comprising
means for receiving the broadcast signal from the plurality of directions; and
means for generating an expected signal for the plurality of directions based on the code characteristics corresponding to the plurality of directions.

59. The apparatus of claim 58, further comprising means for detecting the broadcast signal from each of the plurality of directions based on the plurality of expected signals corresponding to each of the plurality of directions.

60. The apparatus of claim 57, wherein the means for detecting the broadcast signal comprises means for correlating the received broadcast signal with the expected signals.

61. The apparatus of claim 57,
wherein the plurality of modulated signals are generated by modulating a data carrier signal with a plurality of chip sequence signals in order to generate a plurality of modulated signals, and
wherein the simultaneous transmission of the plurality of modulated signals includes the simultaneous transmission of at least two of the plurality of modulated signals at approximately one-half a wavelength of the broadcast signal apart.

62. The apparatus of claim 61, wherein the means for generating a plurality of chip sequence signals comprises means for generating chip sequence signals with randomly phased chips.

63. The apparatus of claim 62, wherein the different code characteristic comprises a different phase characteristic.

64. The apparatus of claim 63, wherein the means for broadcasting the signal comprises means for transmitting a plurality of code beans.

65. The apparatus of claim 61, wherein the means for generating a plurality of chip sequence signals includes means for generating chip sequence signals with random amplitude chips.

66. The apparatus of claim 62, further comprising means for removing chip-to-chip phase shift variations based on the directions.

67. The apparatus of claim 62, wherein the means for detecting the broadcast signal comprises means for detecting the data carrier signal.

\* \* \* \* \*